F. R. F. RICHTER.
AUTO FENDER.
APPLICATION FILED DEC. 19, 1916.

1,289,911. Patented Dec. 31, 1918.

Inventor
Fred R. F. Richter
By Victor J. Evans
Attorney

Witnesses

UNITED STATES PATENT OFFICE.

FRED RICHARD FRANZ RICHTER, OF PHILADELPHIA, PENNSYLVANIA.

AUTO-FENDER.

1,289,911. Specification of Letters Patent. Patented Dec. 31, 1918.

Application filed December 19, 1916. Serial No. 137,872.

*To all whom it may concern:*

Be it known that I, FRED R. F. RICHTER, a subject of the Emperor of Germany, residing at 3401 Powelton avenue, Philadelphia, in the county of Philadelphia and State of Pennsylvania, have invented new and useful Improvements in Auto-Fenders, of which the following is a specification.

This invention relates to fenders, and has particular reference to an improved form of fender or mud guard adaptable for service in connection with motor driven vehicles.

The primary object of the invention is to provide a fender with novel features of construction which will effectively confine road matter, started into motion by the vehicle wheels, within the margins of the fender, so that the said matter will be prevented from splattering or spreading after contacting with the fender.

To this end the invention comprises, among other features a fender which will present inclined mud deflecting walls to the periphery of the vehicle wheel, so that when the latter engages with a wet or muddy roadbed, the refuse thus started into motion will be confined within the inclined walls of the fender, and prevented from unduly escaping therefrom.

Other objects will be in part obvious and in part pointed out hereinafter.

Of the drawings—

Similar characters of reference denote corresponding parts throughout the several views of the drawing.

In order that the aims and achievements of the present invention will be clearly understood, it is advisable to state at this juncture, that the common types of fenders or mud guards now in general use do not entirely prevent road matter from being cast upon the bodies of motor-driven vehicles. This inability of the common fender to completely entrap road matter, has been traced to the general construction and design of the same, that is, in transverse cross section the ordinary fender usually presents a substantially flat or slightly convex surface to the periphery of the vehicle wheel which, as will be explained, does not fully block the progress of the road material set into motion by a vehicle wheel. For instance, when the road material is forcibly propelled by a vehicle wheel against the substantially flat surface of an ordinary fender, it will splatter or diffuse into fine volatile particles, which spread in cloud formation beyond the margins of the fender. This volatile matter is then caught in the wind, always attending a moving vehicle, and carried back so as to be deposited upon the body and other exterior parts of the vehicle. This explains, to a large degree the accumulation of dust and mud upon a motor vehicle after the latter has been operated. Hitherto the average motorist has laid this objection to the action of passing vehicles; whereas, in reality it is the direct fault of incorrectly designed fenders.

Figure 1:
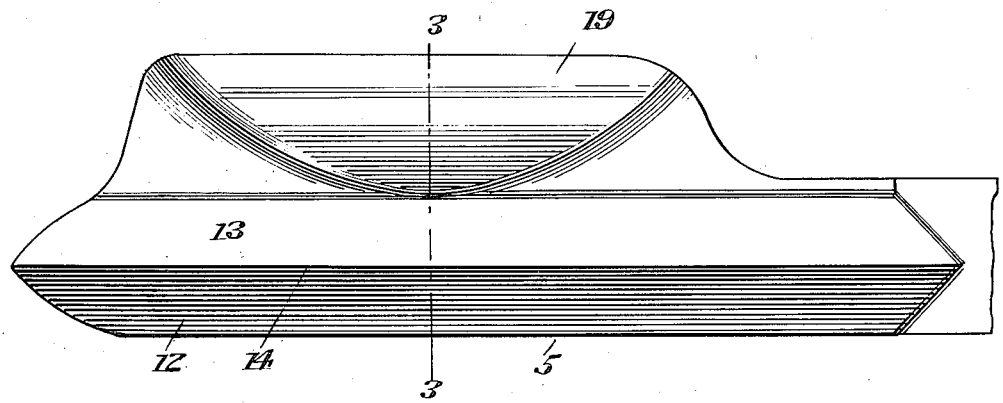
Figure 1 is a top plan view of the fender comprising the present invention.
Figure 2:
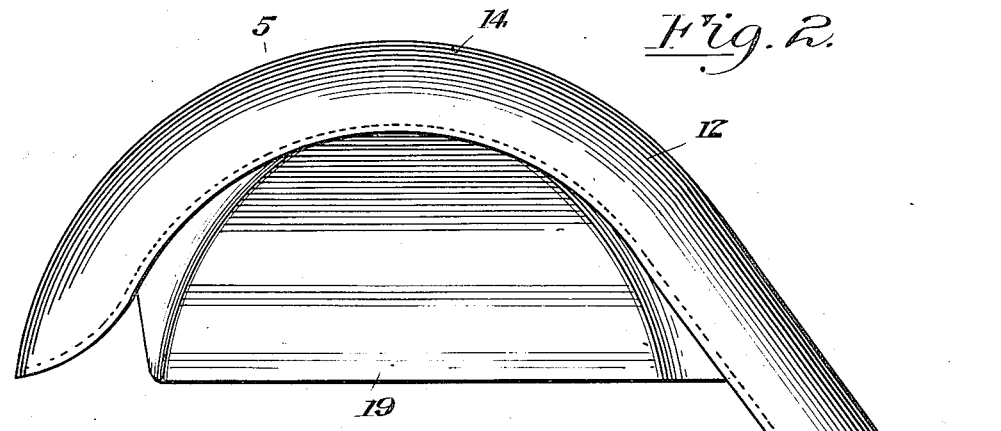
Fig. 2 is a side elevation thereof.
Figure 3:
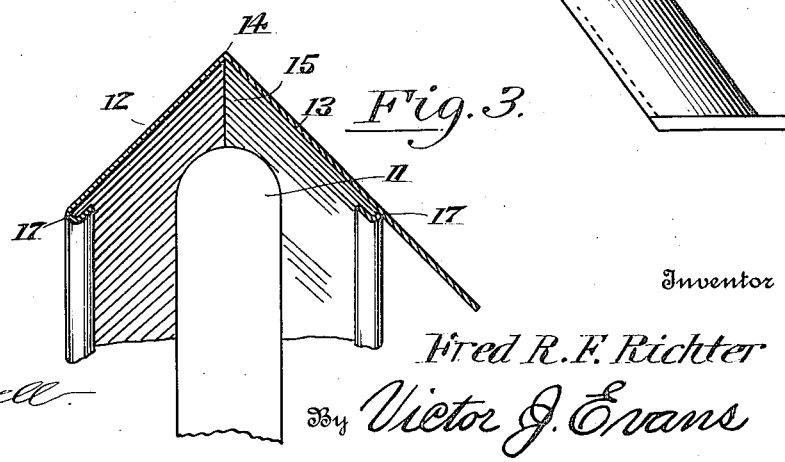
Fig. 3 is a transverse sectional view taken along the line 3—3 of Fig. 1.

In order to overcome the above set forth disadvantages, the present invention provides a vehicle fender 5, which in its present embodiment is formed from an integral section of molded or stamped material, and, as shown in Fig. 1, is shaped to conform to the general contour of the vehicle wheel 11 so as to substantially cover the upper periphery of the latter, as is usual in fender construction. The departure in construction of the fender over the fenders of the prior art, consists in providing the same with a plurality of inclined faces, wall or surfaces 12 and 13, which in cross section figuratively define a triangle. The apex 14 of the surfaces, or the medial line thereof, is approximately disposed over the center line of the wheel 11, as disclosed in Fig. 3, and said surfaces are adapted to extend on approximately 45-degree angles in a downwardly diverging relation, so that an inverted V-shaped pocket will be formed internally of the fender, and in which will operate the tread of the wheel 11.

It will be evident that by reason of this construction, road matter ejected from the tread of the wheel 11, will be cast upon inclined surfaces 12 and 13, which will prevent the same from breaking into volatile particles, by reason of the glancing or indirect blow which the road matter will receive when engaging with said inclined walls. Thus the road refuse will not encounter the abrupt halt or stop as it commonly does when engaging with the usual type of fender; instead it will continue to fly about within the fender in its original condition, by glancing over the inclined surface of said fender, until finally stopped in a gradual manner. Moreover, if the road matter displays a tendency to diffuse into fine particles, the V-shaped pocket 15 of the fender will render it difficult, if not impossible, for the same to escape beyond the bounds of the fender, thereby preventing the same from being carried back by the action of wind upon the body of the vehicle.

In connection with the above fender it has been found advisable to provide the marginal edges thereof with channels or gutters 17, so that the effectiveness of said fender may be materially increased. This is due to the fact that when moisture has reached the lower edges of the inclined faces it will be prevented from blowing off of the latter by virtue of the gutters, which are adapted to receive the moisture and conduct the latter to a lower point along the fender, whence it may be safely discharged without being permitted to engage with the body of the vehicle. Securing webs 19 may be integrally formed or secured to the fender 5 in order that the latter may be readily connected to the frame of a vehicle. The web 19 is of the usual construction and, therefore, will require no special description.

From the foregoing it will be obvious that there has been provided a fender wherein the objects of the present invention have been achieved, and that all of the advantageous features above mentioned are among others present. The fender is relatively simple in construction, can be economically manufactured, and when finished the same will enhance or improve the general appearance of a motor vehicle.

From the foregoing it is thought that the construction and operation of the invention will be readily understood by those skilled in the art, and therefore a more extended explanation is accordingly omitted.

Having described the invention, what is claimed as new and patentable is:

As a new article of manufacture, a vehicle fender of substantially inverted V-shaped formation in cross section, the diverging sides thereof terminating below the opposite sides of the tread of the tire and minimizing the space between the sides of the tire and the adjacent sides of the fender to confine road matter within said space, moisture collecting and discharging gutters formed on the free longitudinal edges of said sides of the fender, and an apron formed on the longitudinal edge of said fender toward the vehicle and extending downwardly as far as the forward end of the fender.

In testimony whereof I affix my signature.

FRED RICHARD FRANZ RICHTER